United States Patent
Erlich et al.

[19]

[11] Patent Number: 6,155,657

[45] Date of Patent: Dec. 5, 2000

[54] DRIVE TRACK FOR SELF-PROPELLED POOL CLEANER

[75] Inventors: Giora Erlich, North Caldwell; Tibor Horvath, Springfield, both of N.J.

[73] Assignee: Aqua Products Inc., Cedar Grove, N.J.

[21] Appl. No.: 09/137,638

[22] Filed: Aug. 21, 1998

[51] Int. Cl.[7] .................................................. B62D 55/26
[52] U.S. Cl. ......................................... 305/178; 305/160
[58] Field of Search .................................... 305/160, 165, 305/167, 178, 179, 180, 185, 191, 195, 157

[56] References Cited

U.S. PATENT DOCUMENTS

| | | | |
|---|---|---|---|
| 1,814,046 | 7/1931 | Kegresse | 305/180 |
| 2,541,177 | 2/1951 | Slemmons | 305/195 X |
| 3,900,231 | 8/1975 | Ohm | 305/178 |

FOREIGN PATENT DOCUMENTS

| | | | |
|---|---|---|---|
| 57-160775 | 10/1982 | Japan | 305/178 |

*Primary Examiner*—Russell D. Stormer
*Attorney, Agent, or Firm*—Abelman, Frayne & Schwab

[57] ABSTRACT

A submersible self-propelled pool or tank cleaner that includes a pair of moving driven endless belts or drive tracks is provided with moving side-projecting elements that extend from either the moving drive track or the drive wheels, or both, in order to contact the side wall of the pool and other projecting structural elements in the pool, to thereby prevent the stationary structural elements of the pool cleaner from being damaged by scraping the side of the pool and to prevent the hard plastic of the cleaner housing from damaging light-weight swimming pool liners. The drive track or belt is provided with raised transverse rib members that terminate in a tip that projects beyond the edge of the belt and extends beyond the projected line of structural elements along the side of the pool cleaner. The hub of the drive wheels around which the belt passes is provided with an extension member that extends outwardly from the hub perpendicular to the longitudinal axis of the cleaner and the direction of travel, a distance that is sufficient to permit the extension member to contact the side and/or bottom of the pool and to prevent the fixed structural elements of the cleaner from contacting the side wall and/or bottom of the pool.

20 Claims, 6 Drawing Sheets

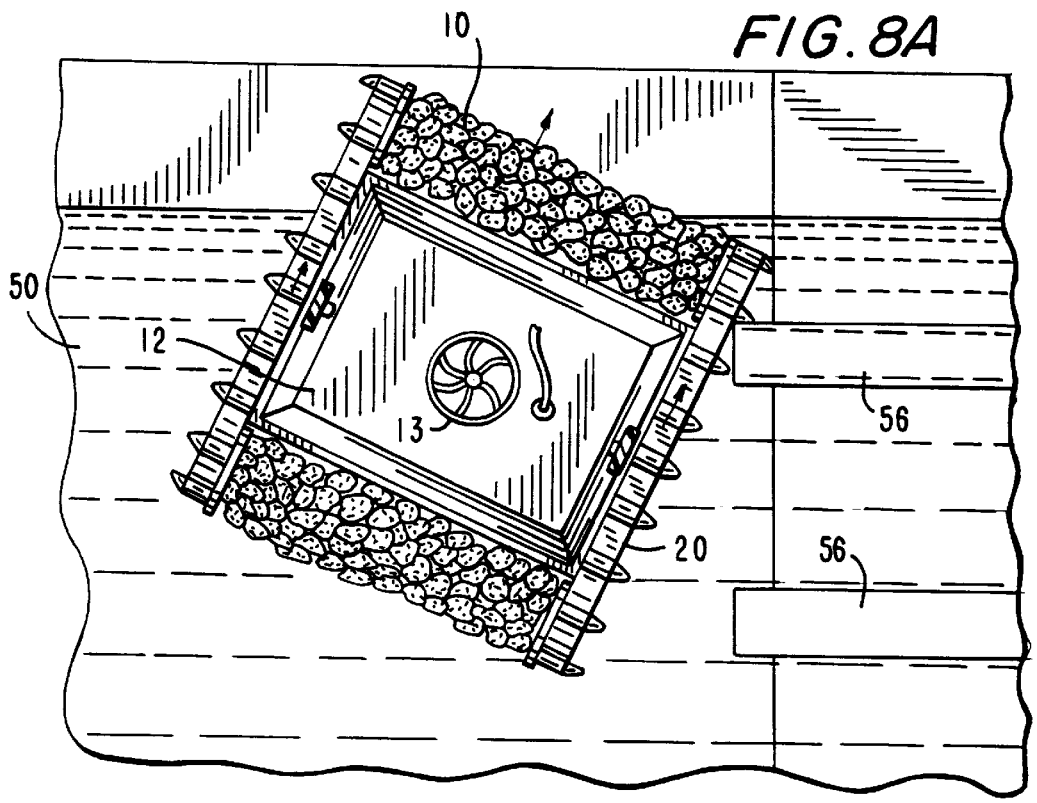
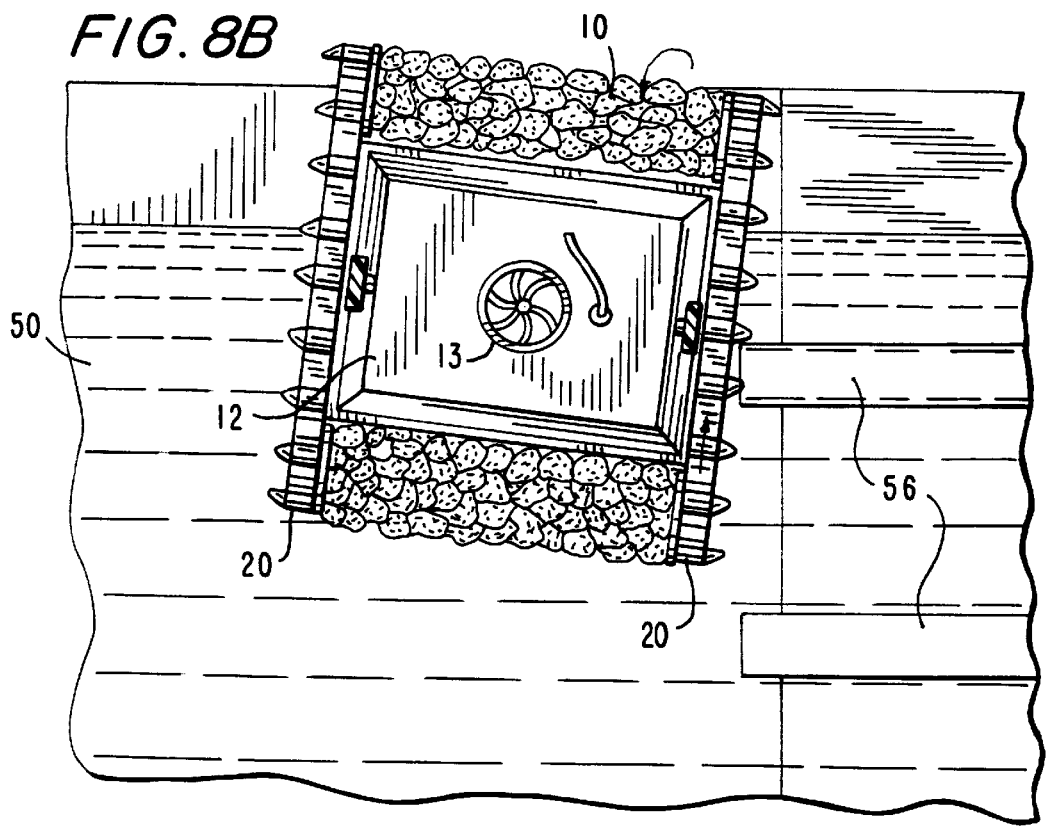

DRIVE TRACK FOR SELF-PROPELLED POOL CLEANER

FIELD OF THE INVENTION

This invention relates to self-propelled submersible swimming pool and tank cleaners that include an endless belt or drive track that contacts the bottom and other surfaces of the pool.

BACKGROUND OF THE INVENTION

Automatic or robotic pool cleaners having one or more electric motors contained in a housing are connected through a drive train that includes at least one drive wheel mounted on a rotating axle and an endless traction belt or drive track in the form of a loop that contacts the bottom and other surfaces of the pool to move the pool cleaner. The drive traction belt can serve as the primary means for moving the pool cleaner and is at all times in contact with the flat bottom and side walls of the pool, as well as any angular surfaces, such as steps, projecting curbs, and the transverse line that exists at the bottom between the deep and shallower ends of some pools. In cleaners of this design, the drive tracks are mounted inboard on either side and may be partially enclosed by the side walls of the housing.

Other pool cleaners known in the art employ cylindrical transverse brushes, generally constructed from foamed plastic material, mounted for rotation at either end of the housing, and the rotating brushes and provide the primary drive means for moving the cleaner across the flat surfaces to be cleaned. In these devices, endless drive tracks are provided as an ancillary means for propelling the cleaner up steps and across other transverse angular surfaces which would otherwise contact the base plate or housing of the cleaner between the rotating brushes. During normal operation on flat surfaces, the diameter or height of the brushes on devices of this design maintain the moving drive tracks a half-inch or more above the flat pool surface.

In the case of swimming pool cleaners of the prior art, the dimensions of the belt typically range from an inch to an inch and one-half wide, about one-eighth inch thick. The exterior surface of the belt is textured or provided with closely-spaced projecting elements intended to improve traction.

The drive tracks are generally fabricated by molding a synthetic or semi-synthetic flexible polymer compound that resists the effects of the sun and chemicals used to treat the water in the pool or tanks being cleaned. The drive track is mounted to pass around one or more pulley-like drive wheels and one or more tensioned idler wheels that engage the belt and retain it in position for rotational movement.

One problem that has been associated with pool cleaners of the prior art that climb and traverse the vertical side walls of the pool is their inability to advance past an inside corner, projecting ladder or other such object. As a result, these prior art cleaners will remain idling in a fixed position in a corner of the pool or at a ladder, wasting cleaning time and energy, awaiting a preprogrammed reversal of the drive tracks. If the pool is constructed with two or more ladders on opposite sides of the pool, the cleaner can be effectively "trapped" in one section of the pool, and must be manually moved to the other side of the ladders in order to complete its cleaning path.

It has also been found that the drive tracks of the prior art are not effective in moving the cleaner up steps or other raised surfaces of in-ground pools and this inability is a deficiency.

In addition, it has been found that the molded plastic cover of prior art pool cleaners can come into contact with the side wall of the pool, or both the side wall and bottom of the pool, as the cleaner moves along the bottom of the pool. This scraping action can also occur in concrete or gunnite pools having a large radius of curvature between the bottom and side walls. This repeated scraping of the surface of the housing detracts from its appearance, and over time, weakens the housing and can wear a hole through a corner or other projecting surface. The housing is a relatively expensive component of the cleaner and its replacement requires a substantially complete disassembly of the unit.

Another problem can develop in pools constructed with a vinyl or other flexible lining, it there the constant contact of the rigid plastic housing of the pool cleaner can eventually lead to damage to the liner, abrading, scratching and even tearing of the liner can occur at positions where the pool cleaner makes repeated contacts over time during its routine transit of the bottom and side wall surfaces.

In order to reduce or eliminate the aesthetic and physical damage to the housing, some manufacturers have installed projecting bumpers on the ends of the housing. In addition to increasing the cost and number of components requiring manufacture, assembly and inventory, these projecting bumper elements can interfere with the programmed movement of the cleaner, or can become trapped behind a ladder and altogether stop the movement of the cleaner.

It has also been found that some pool cleaners of the prior art can become disabled tipped over on their sides, so that neither the moving brushes nor drive tracks are in contact with a surface which might otherwise serve to provide traction for the device and enable it to right itself.

It is therefore one object of the invention to provide an improved construction for a self-propelled submersible pool cleaner that will prevent the housing of the cleaner from scraping the side walls and/or bottom of the pool.

It is also an object of the invention to provide an improved drive track that will facilitate the climbing of steps and over other angular projections.

It is another object of the invention to provide such an improved construction that is inexpensive and that does not required the assembly of additional components to the cleaner housing.

Another object of the invention is to provide means that will prevent a pool cleaner from being disabled or rendered inoperable by being turned on its side.

Yet another object of the invention is to provide a means of preventing further damage to the housings of existing pool cleaners by retrofitting these existing cleaners with an improved, but functionally compatible replacement element.

Another object of the invention is to prevent damage to the cleaner and/or to the pool liner resulting from impact when the cleaner travels down the wall on a diagonal path in impacts the bottom of the pool.

SUMMARY OF THE INVENTION

The above objects and other advantages will be obtained by the invention, which comprises an endless traction belt of improved design for mounting on drive means of a self-propelled pool cleaner, said belt comprising a closed loop having an interior surface and an exterior surface, said exterior surface provided with a plurality of transverse rib members spaced apart from each other around the circumference of the loop, each of said transverse rib members comprising a body portion and a tip, said body portion extending across the width of the loop and said tip projecting beyond the edge of the loop and extending beyond the sidewall of the cleaner or cleaner housing.

In a preferred embodiment of the invention, the traction belt is fabricated as a direct replacement for the traction belts of existing pool cleaners. The old drive tracks are removed from the drive and idling wheels or pulleys on both sides of the pool cleaner, and the traction belt of the invention is installed with the tips extending outwardly from the pool cleaner's housing. The length of the tips is sufficient to cause the housing to stand off from the side wall and/or bottom of the pool when the tips come into contact with the wall.

In a further preferred embodiment of the invention, the vertical-planar projection of the exterior surface of the housing and/or other structural elements of the pool cleaner is approximately in alignment with the outside edge of the belt when the belt is installed on the drive and idling wheels, thereby assuring that the tips will extend beyond the housing.

The drive track or belt is preferably molded as an integral unit from a resilient, but tough and wear-resistant polymer that can withstand contact with the sides of the pool. Suitable molding composition materials include synthetic polymers and copolymers alone and blended with rubber and thermoplastic rubber. One such product that has been found satisfactory is that sold under the trademark SANTOPRENE by Advanced Elastomer Systems of Akron, Ohio.

In accordance with another important aspect of the invention, the transverse rib members are spaced apart from each other around the circumference of the exterior surface of the belt to provide an intermediate flat surface of the belt greater than that known to the prior art. Although the precise distance between the transverse rib members can vary, the exposed intermediate surface of the belt is sufficient to permit the leading edge of a rib to engage the corner or edge of a step or like projection constructed in the side wall or bottom of the pool. As will be understood by one of ordinary skill in this art, the relatively close proximity of the transverse elements formed in the surface of traction belts of the prior art did not provide the appropriate spatial relationship between the transverse member and steps having rounded leading edges, and particularly those with a large radius. The rounded surfaces of the ribs of the prior art belts provided insufficient leverage against the rounded corner surface of the raised step for the machine to advance. The traction belt or drive track of the invention overcomes this limitation to and provides superior stair and angular contour-climbing ability.

In accordance with another embodiment of the invention, a plurality of extension members are attached to the hubs on the moving transverse axles and extend outwardly to contact the side wall and/or bottom of the pool to prevent contact by the cleaner's housing.

Thus, it will be understood from the above description, that in its broadest conception, the method of the comprises a method for preventing contact between the fixed structural elements of a self-propelled submersible swimming pool or tank cleaner and the side walls of a swimming pool or tank, where the cleaner is propelled by at least two moving transverse axles, each of said axles terminating in hubs proximate the exterior sides of the cleaner, the method comprising affixing a moving projecting member to each of the axle hubs where said projecting member extends outwardly from the hub a distance that exceeds the vertical projection of adjacent structural elements of the pool cleaner, and moves in response to the moving transverse axles.

Other objects and advantages of the invention will be apparent from the following description when taken in conjunction with the drawings forming part of this specification.

BRIEF DESCRIPTION OF THE DRAWINGS

FIGS. 8A, 8B and 8C are front elevational views of a portion of the side of a pool and built-in steps illustrating a sequence of movements of a pool cleaner equipped with one embodiment of the invention.

DETAILED DESCRIPTION OF THE PREFERRED EMBODIMENT OF THE INVENTION

Figure 1:
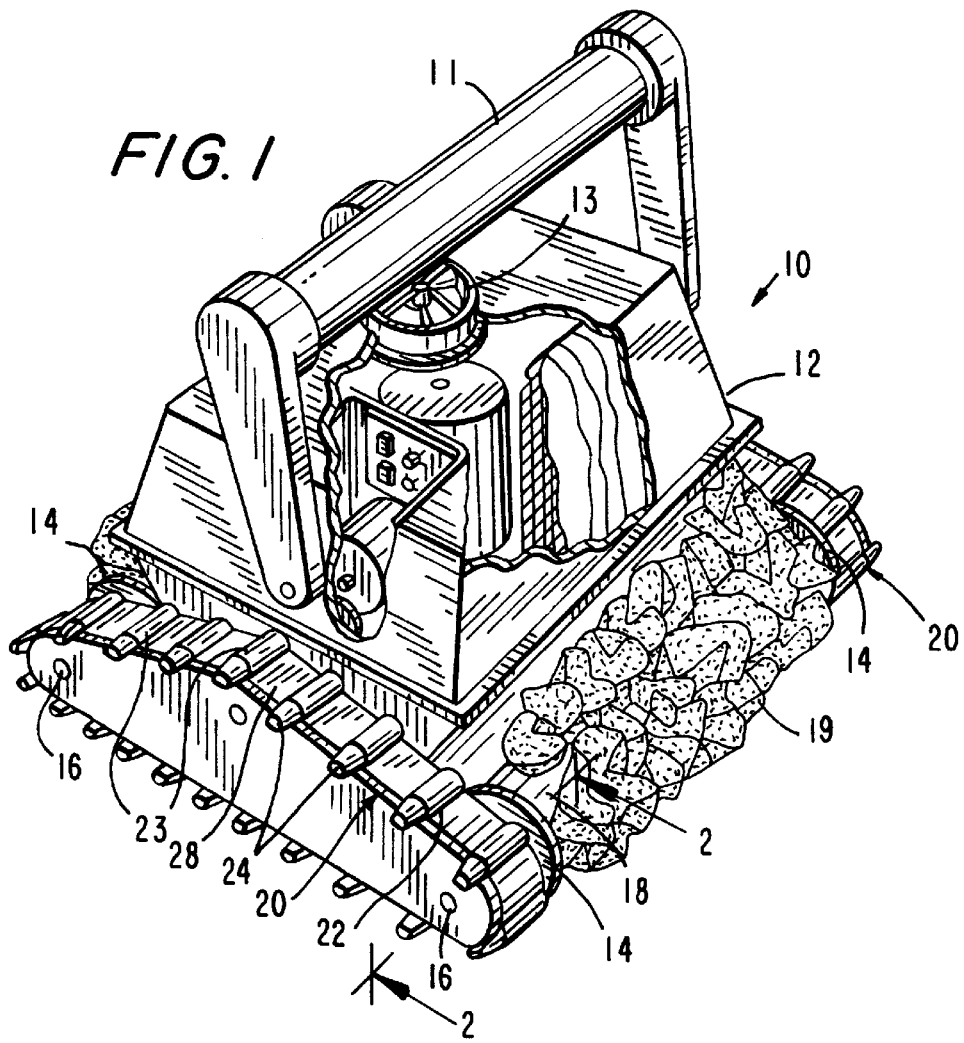
FIG. 1 is a front and side elevational view in perspective of a pool cleaner equipped with one embodiment of the invention.

As shown in FIG. 1, a self-propelled submersible pool cleaner 10 is equipped with a pair of traction drive belts 20 constructed in accordance with the invention. The drive tracks 20 are mounted on drive wheels 14 attached to axles 14. The pool cleaner 10 further comprises a housing 12, rotating tube assembly 18 on which are mounted cleaning brushes 19 which rotate and contact the pool surface to be cleaned as the pool cleaner advances.

In the preferred embodiment illustrated in FIG. 1, the endless drive belt 20 is produced as an integral molded unit with a plurality of spaced apart transverse rib members 22 spanning the width of the belt and extending upwardly from the exterior surface of the belt. Each transverse rib member terminates in a tip that projects beyond the edge of the surface of the belt 20. In the preferred embodiment illustrated in FIGS. 1 and 2, and as most clearly shown in FIG. 3, the tip 24 has a generally semi-circular cross section in the vertical plane corresponding to the longitudinal axis of belt 20. The free end of the tip is narrower than its base where it joins the body portion 23 of the transverse rib member 22.

Figure 2:
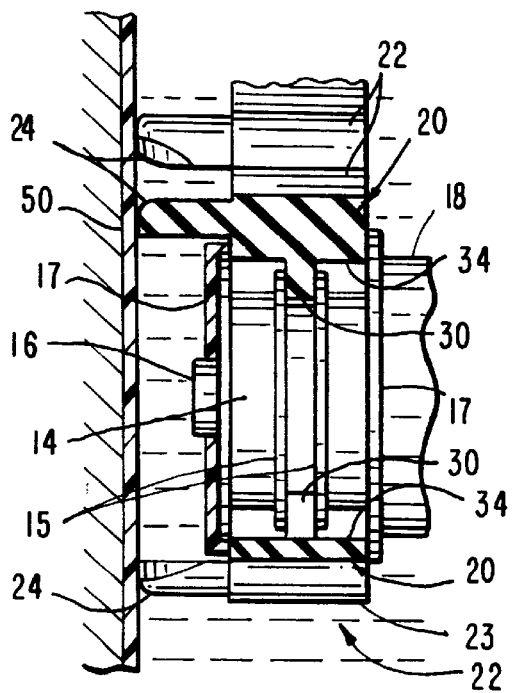
FIG. 2 is a front elevational view, partly in section, along section lines 2–2 of FIG. 1 adjacent the side wall of a pool.

As will be seen in FIG. 2, as the pool cleaner 10 approaches the side wall 50 of a swimming pool, one or more of the projecting tips 24 come into contact with the surface of the wall and prevent the housing and/or other molded plastic elements comprising the exterior structure of the cleaner from contacting the wall.

Figure 4:
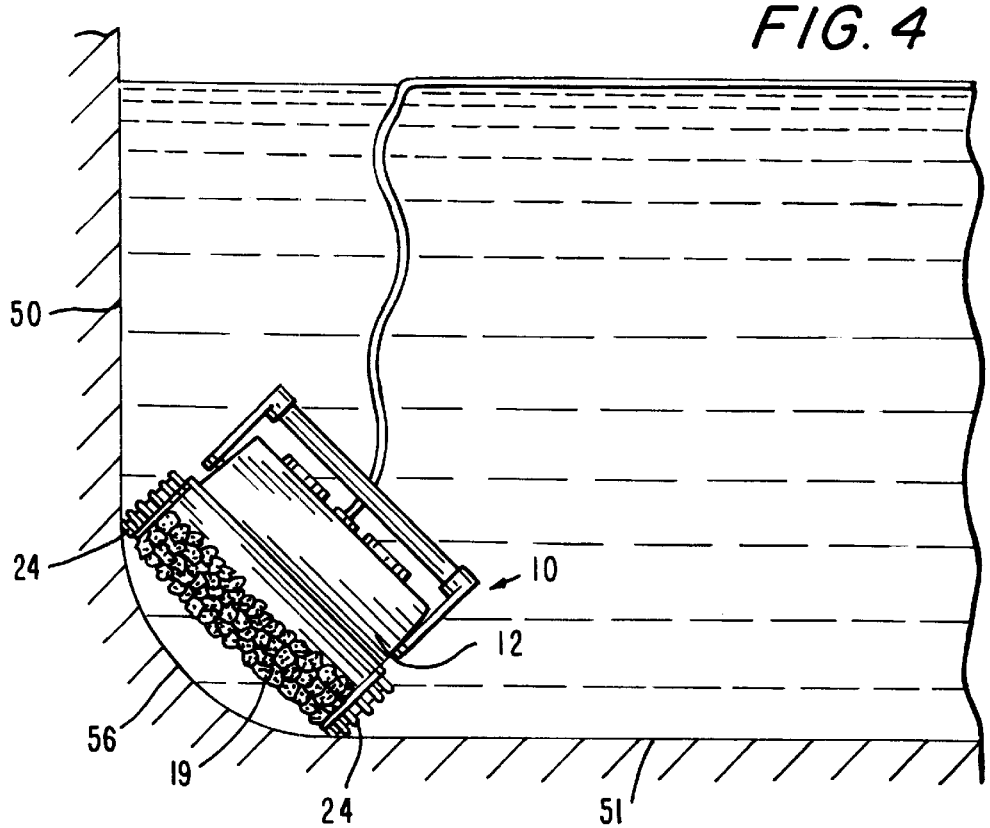
FIG. 4 is a front elevational view, partly in section, showing the embodiment of FIG. 1 operating in pool.

Shown in FIG. 4, is a section of a pool having a large radius of curvature 56 between the bottom 51 and side walls 50, such as are typical of pools having a concrete or gunnite interior. The housing 12 and/or other structural members of pool cleaners of the prior art often scraped on the side wall and/or bottom when the cleaners were moving along the length of this curved contour. However, as shown in FIG. 4, when equipped with a moving belt of the invention, projecting tips 24 support the cleaner on each side and advance it until it reaches a corner, or otherwise assumes another orientation. In this way, the projecting tips 24 protect the housing 12 and prevent it from contacting the bottom and/or side wall of the pool.

As will be apparent from the above description of the invention, if a pool cleaner equipped with a moving belt having projecting tips 24 should slide to its side on the bottom of the pool, the action of the moving tips will cause the cleaner to continue to move until it eventually comes into contact with a vertical surface that will enable the device to resume its normal cleaning position.

Figure 3:
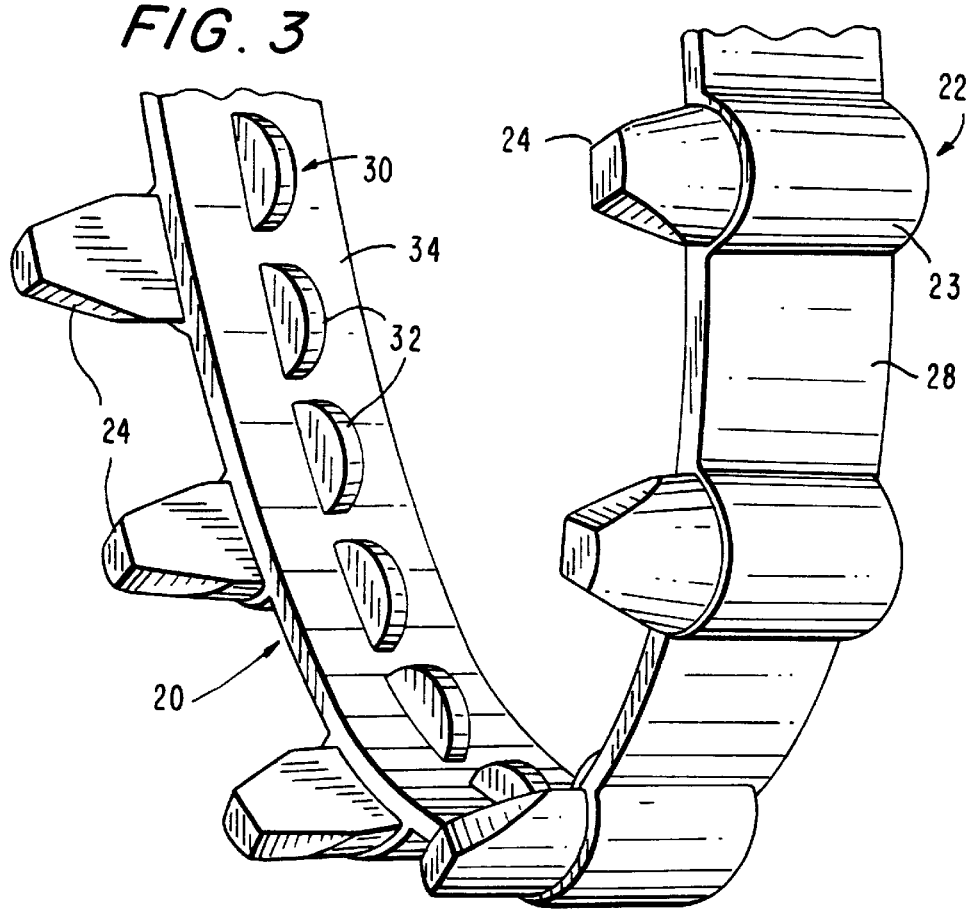
FIG. 3 is a perspective view of a typical segment of one embodiment of the traction belt of the invention.

As also shown in the cross sectional view of FIG. 2, and in FIG. 3, the interior surface 34 of belt 20 is provided with guide member 30 extending circumferentially around the belt. In the preferred embodiment of FIG. 3, guide member 30 is comprised of a plurality of spaced apart teeth 32 that are formed integrally with the molded belt 20. Guide means 30 are preferably provided to engage a corresponding groove or other contour formed in the powered drive means which produces the movement of the belt to thereby advance the pool cleaner. As shown in FIG. 2, the drive wheel 14 is formed with exterior shoulders 17 and interior shoulders 15 that form a groove to receive guide means 30. As will be understood by one of ordinary skill in the art, more than one guide means or row of projecting teeth can be provided on the interior surface of the belt to mate with a corresponding number of grooves or contours in the drive means. In yet a further embodiment (not shown), the interior surface can be molded to form a plurality of spaced apart recesses to positively engage corresponding projections in the drive means, where the drive means is in the nature of a wheel with gear teeth that project radially outwardly to engage corresponding recesses in the belt. However, for the purposes of a swimming pool cleaner, the configuration of the guide means comprising projecting teeth 32 is sufficient to maintain the belt 20 in proper alignment on drive wheel 14 in the groove formed by shoulders 15.

Figure 5:
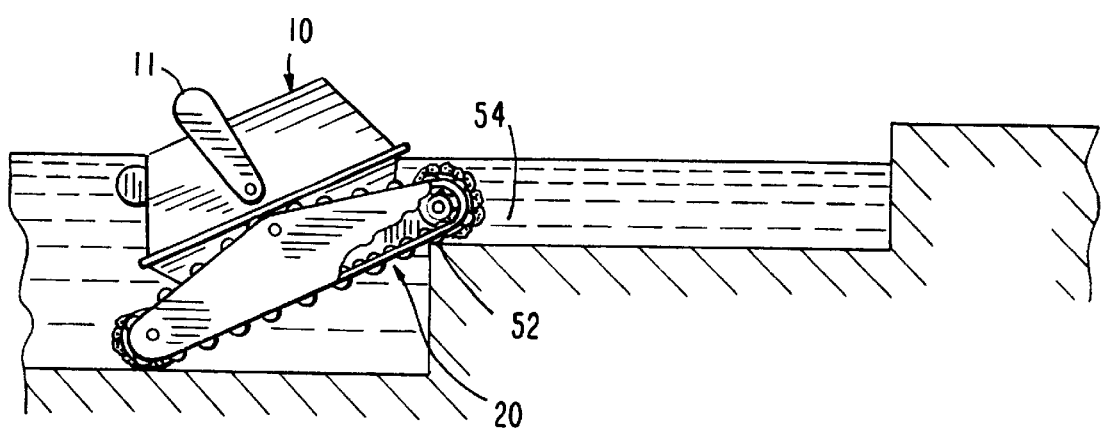
FIG. 5 is a side elevational view of a pool cleaner equipped with an embodiment of the invention of FIG. 1 in partial section in operation in a pool.

As shown in FIGS. 1 and 2, the spacing between transverse rib members 22 along the exterior surface of belt 20 defines and area 28 that is generally not in contact with a flat or planar surface of the pool. This configuration differs from that of the traction or drive belts of the prior art in which the exterior surface of the belt is provided with transverse gripping elements that are closely spaced. In accordance with the invention, it has been found that such closely-spaced transverse elements as employed by the prior art do not function efficiently to enable the pool cleaner to climb on a step or other raised surface in the pool which rises at a 90 degree angle to the bottom of the pool. When the transverse rib members 22 are spaced apart in accordance with the invention, the body portion 23 of the rib is able to efficiently engage the corner of a step or other raised structure in the pool and enables the pool cleaner to mount the elevated planar surface. Although the spacing between the transverse rib members 23 can vary within the range from about one-half to about two inches, a preferred spacing is about one inch. In any event, the distance between the rib members can be determined with reference to the configuration of the edge or corner of the step or other submerged structure. For example, if the corner 52 of the step 54 is somewhat rounded, the distance 28 between the transverse rib members 22 should be sufficient to permit full contact of the corner surface 52 with the exterior belt surface 28 as the leading surface of the rib member 22 makes contact with the horizontal tread surface 54 of the step as shown in FIG. 5.

With further reference to FIG. 3, it will be understood that the configuration and spacing of the teeth 32 along the circumference of the interior surface 34 of the belt is such that the teeth will not contact each other as they assume the minimum radius required to pass around the periphery of drive wheel 14. The generally semi-circular configuration of teeth 32 as shown in FIG. 3 is preferred; however, teeth of other curvilinear and/or rectilinear configurations can be employed as guide member 30.

It will be understood that the shape of the projecting tip 24 illustrated in FIG. 3 represents but one preferred embodiment, and that other curvilinear and/or rectilinear shapes can be employed with equal effectiveness in the practice of the invention. In the practice of the method of the invention, the principal consideration is that the length of the tip extending away from the exterior surface of the belt be sufficient to insure that the tip will contact the side wall before the housing or any other attached structural element of the pool cleaner can come into contact with the adjacent wall. In other words, the free end of the tip 24 extends beyond the vertical projection of other structural members forming the pool cleaner assembly.

Although in the preferred embodiment illustrated in FIG. 3, the drive belt is produced as an integral molded construction, the traction belt of the invention can be produced by molding only the endless belt and body portion of the rib members as an integral unit and securing the tips to the body portion in a subsequent step. In this embodiment of the invention, (not shown), the tip can be produced by machining or molding an engineering plastic having a greater resistance to wear than the flexible resilient composition of the belt and body portion of the rib members. The use of separate tips also has the advantage of permitting replacement of the tips in the event of their wear, and also permits the selection of tips of different length to accommodate varying constructions and configurations of the pool cleaner housing and other structural elements requiring protection. The separate tips can be affixed to the body portion of the rib by molding a rigid female threaded insert into the body portion and providing the tip with a mating male threaded member.

It will also be well understood by one of ordinary skill in the art that the projecting tips can be used with belts other than those intended to engage angular surface projections or to drive the cleaner over flat surfaces of the pool. The improved belt with projecting tips 24 can be advantageously employed with an otherwise smooth belt that is used only to transfer driving power from a motor pulley or a driven axle to one or more other transverse axles. The distance between the projecting tips along the belt is not critical and can be determined with respect to the design of a specific pool cleaner's structural elements.

In yet a further embodiment of the invention, the body portion of the rib member can be produced from a polymeric molding composition that is different than that of the underlying belt and assembled to the belt, as by adhesive and/or mechanical means that are well known in the art. The use of a separate body portion has the advantage of utilizing a polymeric composition having a greater coefficient of friction than could be met by the composition of the belt which requires greater strength and other differences in physical properties.

Figure 6:
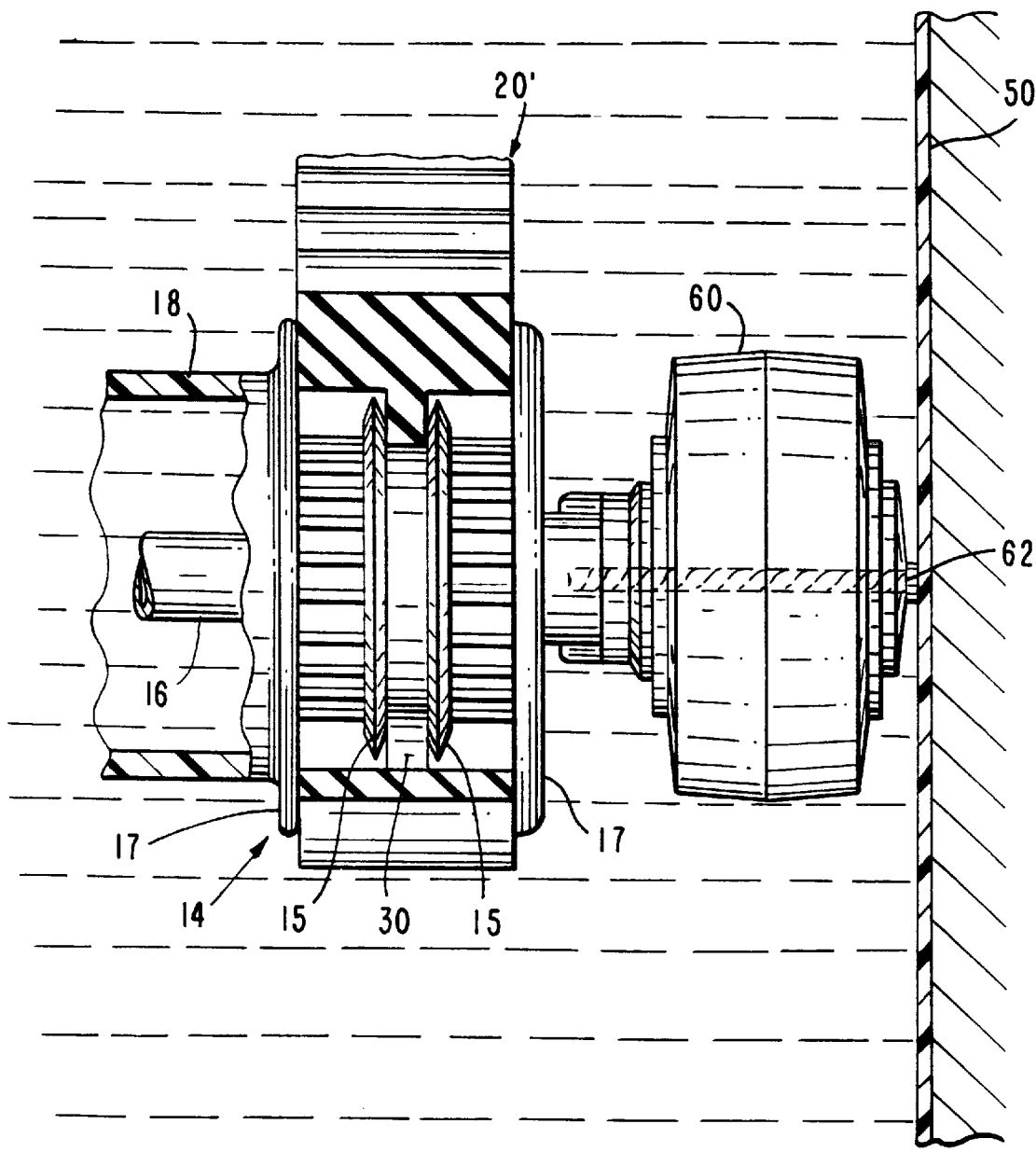
FIG. 6 is a front elevational view, partly in section, of a drive wheel provided with another embodiment of the invention.

In another preferred embodiment of the invention shown in FIG. 6, the drive wheel 14 is provided with an axial extension member 60 that extends beyond the stationary structural elements comprising the pool cleaner and its housing. In accordance with the invention, the axial extension member 60 is mounted on the exterior surface of each of the four drive and/or idler wheels 14 located at each corner of the pool cleaner. Since the extension member projects outward laterally, it will contact the vertical side wall of the pool and prevent the housing 12 and/or other stationary structural members from coming into contact with the pool's side wall or other vertical submerged surfaces.

Figure 7:
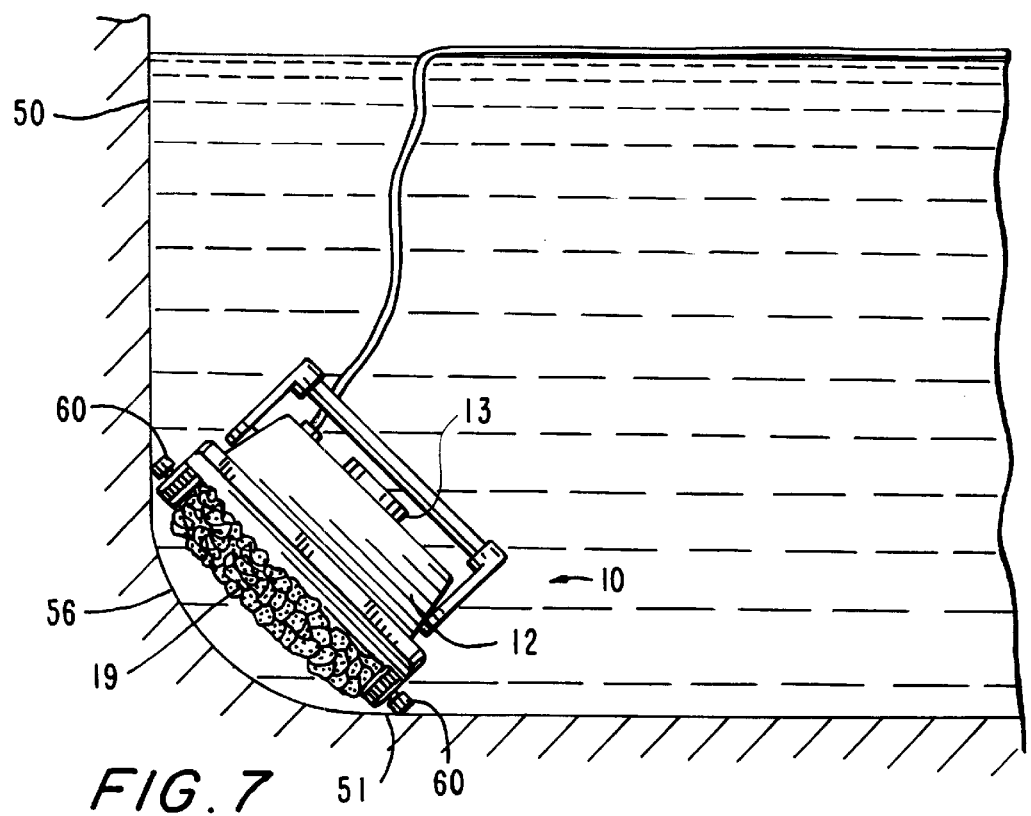
FIG. 7 is a front elevational view, partly in section, showing the embodiment of FIG. 6 in operation in pool.

As shown in FIG. 7, the extension member 60 supports and provides the driving force to one or both sides of the pool cleaner while it completes its transit along the large-radius contour 56 between the side wall 50 and bottom 51 of the pool.

The extension member 60 can be mounted on the drive hub 14 using one or more separate threaded fasteners 62, or the wheel 14 itself can be formed integrally with the extension member 60. The extension member can be produced by the molding or machining of a wear-resistant engineering plastic such as nylon, TEFLON® or other water-resistant, low friction material.

It will also be understood from the above description that the specific configuration of the extension member can be modified from that illustrated in the embodiments of FIGS. 6 and 7 to accommodate or retrofit pool cleaners of varying design. For example, the extension member 60 can be produced with a conical or a truncated conical cross-section (not shown) in order to provide greater contact between the driving surface of the extension member and the curved surface 56 of the pool. The extension member 60 can also be used in conjunction with a drive track or belt 20 having projecting tips 24 to provide added protection under differing conditions in pools of various designs.

Figure 8C:
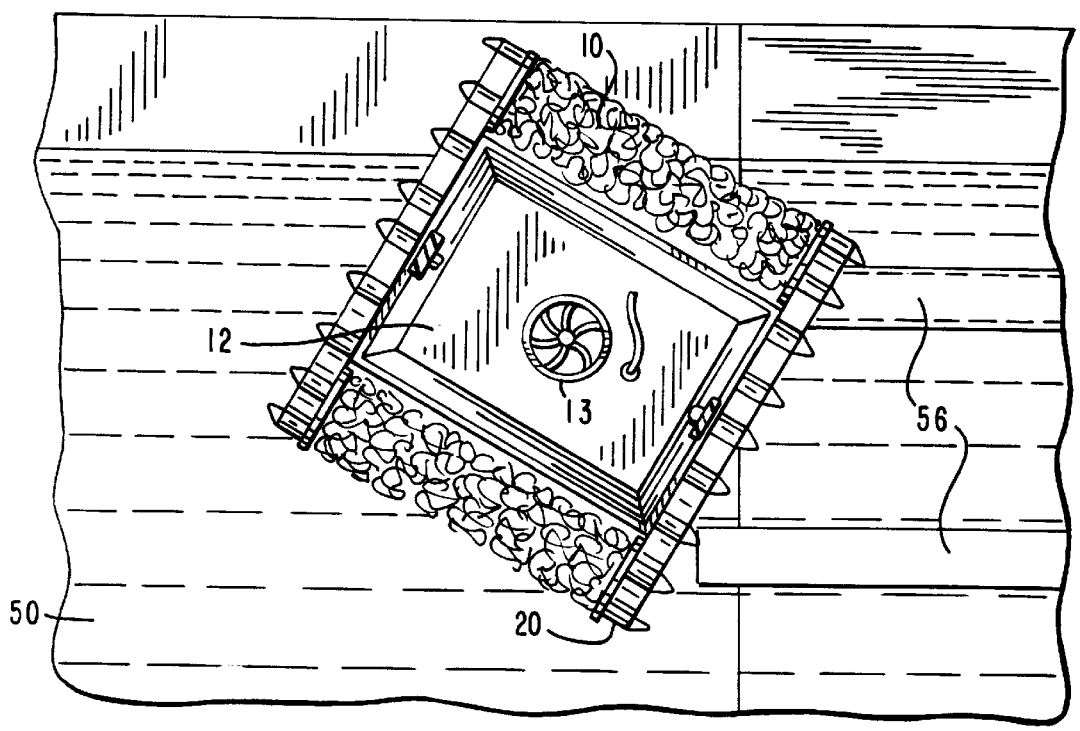

With reference to FIGS. 8A, 8B and 8C, there is illustrated a section of the side wall 50 of a pool that is constructed with built-in steps 56 that project into the pool beyond the surface of the side wall. As shown in FIG. 8A, the pool cleaner 10 moves diagonally up the wall towards the surface of the water and the projecting tip 24 of the drive track 20 contacts the edge of one of the steps and, as shown in FIG. 8B, continues to climb the wall, assuming a more vertical attitude. Once the upper end of the pool cleaner passes the surface of the pool, the cleaner falls back into the pool and the force of the water jet expelled from discharge port 13 on the surface of cleaner 10 moves the cleaner back against the wall and partly onto the steps 56. As a consequence of this movement, the cleaner is able to climb onto, and past the projecting steps. Cleaners equipped with tracks of the prior art cannot execute this maneuver.

From the above, it will be understood that the invention provides the means for achieving all of the objects and advantages described, and that it will be delimited with reference to the claims that follows.

We claim:

1. An endless traction belt for mounting on drive means of a self-propelled submersible pool cleaner, said belt comprising a closed loop having an interior surface and an exterior surface, said exterior surface provided with a plurality of transverse rib members spaced apart from each other around the circumference of the loop, each of said transverse rib members comprising a body portion and a tip, said body portion extending across the width of the loop and said tip projecting beyond the edge of the loop and extending outwardly from the pool cleaner.

2. The endless traction belt of claim 1 where said tip and body portion are integrally formed.

3. The endless traction belt of claim 2 where said tip and body portion are molded from a resilient synthetic polymer composition.

4. The endless traction belt of claim 2 where the tip and body portion are formed integrally with the loop.

5. The endless traction belt of claim 4 that is molded from a resilient polymer composition.

6. The endless traction belt of claim 5, where the polymer composition comprises thermoplastic rubber.

7. The endless traction belt of claim 1 where the transverse rib members are generally semi-cylindrical.

8. The endless traction belt of claim 1 where the transverse rib members are rectilinear.

9. The endless traction belt of claim 7 where the tip has a generally semi-circular cross-section in a plane parallel to the longitudinal axis of the loop.

10. The endless traction belt of claim 9 where the tip has a base joined to the rib and a free end opposite said base, and the tip is tapered inwardly from the base to the free end.

11. The endless traction belt of claim 9 where the tip has a free end and the free end is narrower than the opposite end where the tip is joined to the transverse rib.

12. The endless traction belt of claim 1 where the loop is provided with at least one guide member extending around the interior surface, said guide member being configured to engage the drive means of the self-propelled pool cleaner.

13. The endless traction belt of claim 12 where the at least one guide means comprises a plurality of spaced apart teeth that are integral with the loop.

14. The endless traction belt of claim 13 where the at least one guide means comprises a single row of teeth centrally positioned and extending longitudinally around the interior surface of the loop.

15. The endless traction belt of claim 12 where the drive means comprises a drive wheel having an exterior drive surface and at least one circumferential groove in said drive surface, said at least one groove being configured to receive said at least one guide member and said drive surface configured to engage the interior surface of the loop.

16. The endless traction belt of claim 13 where the teeth comprise arcuate segments.

17. The endless traction belt of claim 16 where the adjacent surfaces of the arcuate segments are spaced at a distance such that the segments do not make contact with each other when the loop engages the drive means.

18. The endless traction belt of claim 17 where the circumference of the exterior surface of the closed loop is from about 25 inches to about 30 inches in circumference and the height of the rib members above the exterior surface is from about one-quarter inches to five-eighths of an inch.

19. The endless traction belt of claim 18 where the distance between the transverse rib members as measured on the exterior surface of the loop is from about one-half to about two inches.

20. The endless traction belt of claim 18 where the length of the tip is from about one-quarter to about two inches.

* * * * *